(12) United States Patent
Sathyanarayana et al.

(10) Patent No.: US 11,281,944 B2
(45) Date of Patent: *Mar. 22, 2022

(54) SYSTEM AND METHOD FOR CONTEXTUALIZED VEHICLE OPERATION DETERMINATION

(71) Applicant: Nauto, Inc., Palo Alto, CA (US)

(72) Inventors: Suchitra Sathyanarayana, Palo Alto, CA (US); Ravi Kumar Satzoda, Palo Alto, CA (US); Alex Thompson, Palo Alto, CA (US); Michael Gleeson-May, Palo Alto, CA (US); Ludmila Levkova, Palo Alto, CA (US)

(73) Assignee: Nauto, Inc., Palo Alto, CA (US)

( * ) Notice: Subject to any disclaimer, the term of this patent is extended or adjusted under 35 U.S.C. 154(b) by 241 days.

This patent is subject to a terminal disclaimer.

(21) Appl. No.: 16/430,810

(22) Filed: Jun. 4, 2019

(65) Prior Publication Data

US 2019/0286948 A1 Sep. 19, 2019

Related U.S. Application Data

(63) Continuation of application No. 16/011,437, filed on Jun. 18, 2018, now Pat. No. 10,430,695.

(Continued)

(51) Int. Cl.
*G06K 9/62* (2006.01)
*G06N 20/00* (2019.01)
(Continued)

(52) U.S. Cl.
CPC ........... *G06K 9/6289* (2013.01); *B60W 30/00* (2013.01); *B60W 30/095* (2013.01);
(Continued)

(58) Field of Classification Search
CPC . G06T 7/50; G06T 7/70; B60W 40/08; G05D 1/021; G06K 9/00805;
(Continued)

(56) References Cited

U.S. PATENT DOCUMENTS 5,584,035 A 12/1996 Duggan et al.
6,018,728 A 1/2000 Spence et al.
(Continued)

FOREIGN PATENT DOCUMENTS

DE 102009905730 A1 7/2010
EP 3057061 B1 8/2017
(Continued)

OTHER PUBLICATIONS

"Which P&C Insurers Hve Filed Patents Related to Autonomous Vehicles", https://www.cbinsights.com/research/autonomous-vehicle-insurance-patents/?ReillyBrennanFoT downloaded from the internet on Sep. 4, 2018, Dec. 14, 2016.
(Continued)

*Primary Examiner* — Maceeh Anwari
(74) *Attorney, Agent, or Firm* — Vista IP Law Group, LLP

(57) ABSTRACT

A method for determining event data including: sampling a first data stream within a first time window at a first sensor of an onboard vehicle system coupled to a vehicle, extracting interior activity data from the first data stream; determining an interior event based on the interior activity data; sampling a second data stream within a second time window at a second sensor of the onboard vehicle system; extracting exterior activity data from the second image stream; determining an exterior event based on the exterior activity data; correlating the exterior event and the interior event to generate combined event data; automatically classifying the combined event data to generate an event label; and auto-
(Continued)

matically labeling the first time window of the first data stream and the second time window of the second data stream with the combined event label to generate labeled event data.

18 Claims, 4 Drawing Sheets

Related U.S. Application Data

(60) Provisional application No. 62/521,091, filed on Jun. 16, 2017.

(51) Int. Cl.

| | | |
|---|---|---|
| *B60W 30/00* | (2006.01) | |
| *B60W 30/095* | (2012.01) | |
| *G05D 1/02* | (2020.01) | |
| *G06Q 10/00* | (2012.01) | |
| *G07C 5/08* | (2006.01) | |
| *G08G 1/01* | (2006.01) | |
| *G08G 1/04* | (2006.01) | |
| *G08G 1/16* | (2006.01) | |
| *G06T 7/50* | (2017.01) | |
| *G06T 7/70* | (2017.01) | |
| *B60W 40/08* | (2012.01) | |
| *G06K 9/00* | (2006.01) | |
| *G06N 3/04* | (2006.01) | |
| *G06N 3/08* | (2006.01) | |
| *H04N 5/247* | (2006.01) | |

(52) U.S. Cl.
CPC ............ *B60W 40/08* (2013.01); *G05D 1/021* (2013.01); *G05D 1/0214* (2013.01); *G05D 1/0221* (2013.01); *G05D 1/0251* (2013.01); *G06K 9/00805* (2013.01); *G06K 9/00845* (2013.01); *G06K 9/6257* (2013.01); *G06K 9/6267* (2013.01); *G06K 9/6293* (2013.01); *G06N 3/04* (2013.01); *G06N 3/084* (2013.01); *G06N 20/00* (2019.01); *G06Q 10/00* (2013.01); *G06T 7/50* (2017.01); *G06T 7/70* (2017.01); *G07C 5/0866* (2013.01); *G08G 1/0112* (2013.01); *G08G 1/0129* (2013.01); *G08G 1/0145* (2013.01); *G08G 1/04* (2013.01); *G08G 1/166* (2013.01); *B60W 2040/0872* (2013.01); *B60W 2540/22* (2013.01); *B60W 2554/00* (2020.02); *G05D 2201/0213* (2013.01); *G06Q 10/20* (2013.01); *G06T 2207/20076* (2013.01); *H04N 5/247* (2013.01)

(58) Field of Classification Search
CPC ............ G06K 9/00845; G06K 9/6257; G06K 9/6267; G06N 3/04; G06N 3/084
USPC ........................................................ 701/301
See application file for complete search history.

(56) References Cited

U.S. PATENT DOCUMENTS

| | | | |
|---|---|---|---|
| 6,496,117 B2 | 12/2002 | Gutta et al. | |
| 6,927,694 B1 | 8/2005 | Smith et al. | |
| 7,148,913 B2 | 12/2006 | Keaton et al. | |
| 7,471,929 B2 | 12/2008 | Fujioka et al. | |
| 7,639,148 B2 | 12/2009 | Victor | |
| 7,646,922 B2 | 1/2010 | Au et al. | |
| 7,853,072 B2 | 12/2010 | Han et al. | |
| 7,868,821 B2 | 1/2011 | Hoshizaki | |
| 7,912,288 B2 | 3/2011 | Winn et al. | |
| 7,974,748 B2 | 7/2011 | Goerick et al. | |
| 8,022,831 B1 | 9/2011 | Wood-Eyre | |
| 8,174,568 B2 | 5/2012 | Samarasekera et al. | |
| 8,195,394 B1 | 6/2012 | Zhu et al. | |
| 8,254,670 B2 | 8/2012 | Prokhorov | |
| 8,266,132 B2 | 9/2012 | Ofek et al. | |
| 8,301,344 B2 | 10/2012 | Simon et al. | |
| 8,344,849 B2 | 1/2013 | Larsson et al. | |
| 8,369,608 B2 | 2/2013 | Gunaratne | |
| 8,447,519 B2 | 5/2013 | Basnayake et al. | |
| 8,487,775 B2 | 7/2013 | Victor et al. | |
| 8,498,813 B2 | 7/2013 | Oohashi et al. | |
| 8,502,860 B2 | 8/2013 | Demirdjian | |
| 8,510,196 B1 | 8/2013 | Brandmaier et al. | |
| 8,594,920 B2 | 11/2013 | Shida | |
| 8,606,492 B1 | 12/2013 | Botnen | |
| 8,666,644 B2 | 3/2014 | Goto | |
| 8,676,498 B2 | 3/2014 | Ma et al. | |
| 8,744,642 B2 | 6/2014 | Nemat-nasser et al. | |
| 8,761,439 B1 | 6/2014 | Kumar et al. | |
| 8,854,199 B2 | 10/2014 | Cook et al. | |
| 8,934,709 B2 | 1/2015 | Saptharishi et al. | |
| 8,952,819 B2 | 2/2015 | Nemat-nasser | |
| 9,053,554 B2 | 6/2015 | Uchida et al. | |
| 9,079,571 B2 | 7/2015 | Trost et al. | |
| 9,081,650 B1 | 7/2015 | Brinkmann et al. | |
| 9,111,147 B2 | 8/2015 | Thornton et al. | |
| 9,121,713 B2 | 9/2015 | Samarasekera et al. | |
| 9,146,558 B2 | 9/2015 | Field et al. | |
| 9,158,962 B1 | 10/2015 | Nemat-nasser et al. | |
| 9,180,887 B2 | 11/2015 | Nemat-nasser et al. | |
| 9,201,932 B2 | 12/2015 | Silver et al. | |
| 9,235,750 B1 | 1/2016 | Sutton et al. | |
| 9,305,214 B1 | 4/2016 | Young et al. | |
| 9,327,743 B2 | 5/2016 | Green et al. | |
| 9,330,571 B2 | 5/2016 | Ferguson et al. | |
| 9,349,113 B2 | 5/2016 | Bashkin | |
| 9,439,036 B2 | 9/2016 | Spears et al. | |
| 9,465,978 B2 | 10/2016 | Hachisuka et al. | |
| 9,472,102 B2 | 10/2016 | Mcclain et al. | |
| 9,514,626 B2 | 12/2016 | Wu et al. | |
| 9,535,878 B1 | 1/2017 | Brinkmann et al. | |
| 9,573,541 B2 | 2/2017 | Graumann et al. | |
| 9,679,480 B2 | 6/2017 | Hakeem | |
| 9,731,727 B2 | 8/2017 | Heim et al. | |
| 9,734,414 B2 | 8/2017 | Samarasekera et al. | |
| 9,734,455 B2 | 8/2017 | Levinson et al. | |
| 9,767,625 B1 | 9/2017 | Snyder et al. | |
| 9,845,097 B2 | 12/2017 | Prakah-Asante et al. | |
| 9,881,218 B2 | 1/2018 | Ogata et al. | |
| 9,892,558 B2 | 2/2018 | Troy et al. | |
| 9,928,432 B1 | 3/2018 | Sathyanarayana et al. | |
| 2003/0169907 A1 | 9/2003 | Edwards et al. | |
| 2004/0168148 A1 | 8/2004 | Goncalves et al. | |
| 2005/0002558 A1 | 1/2005 | Franke et al. | |
| 2005/0273218 A1 | 12/2005 | Breed et al. | |
| 2005/0273263 A1 | 12/2005 | Egami et al. | |
| 2006/0187305 A1 | 8/2006 | Trivedi et al. | |
| 2006/0247847 A1 | 11/2006 | Carter et al. | |
| 2007/0050108 A1 | 3/2007 | Larschan et al. | |
| 2007/0100669 A1 | 5/2007 | Wargin et al. | |
| 2007/0120948 A1 | 5/2007 | Fujioka et al. | |
| 2007/0152433 A1 | 7/2007 | Weichenberger et al. | |
| 2007/0154063 A1 | 7/2007 | Breed | |
| 2007/0280505 A1 | 12/2007 | Breed et al. | |
| 2008/0036580 A1 | 2/2008 | Breed et al. | |
| 2008/0084283 A1 | 4/2008 | Kalik | |
| 2008/0167814 A1 | 7/2008 | Samarasekera et al. | |
| 2009/0080697 A1 | 3/2009 | Kishikawa et al. | |
| 2009/0261979 A1 | 10/2009 | Breed et al. | |
| 2010/0209881 A1 | 8/2010 | Lin et al. | |
| 2010/0209891 A1 | 8/2010 | Lin et al. | |
| 2010/0219944 A1 | 9/2010 | Mc et al. | |
| 2010/0312745 A1 | 12/2010 | Tabak | |
| 2011/0128374 A1 | 6/2011 | Shellshear et al. | |
| 2012/0154425 A1 | 6/2012 | Kim | |
| 2012/0263346 A1 | 10/2012 | Datta et al. | |
| 2013/0073114 A1 | 3/2013 | Nemat-Nasser et al. | |
| 2013/0093886 A1 | 4/2013 | Rothschild | |

(56) References Cited

U.S. PATENT DOCUMENTS

| | | |
|---|---|---|
| 2013/0142390 A1 | 6/2013 | Othmezouri et al. |
| 2013/0194127 A1 | 8/2013 | Ishihara et al. |
| 2014/0037138 A1 | 2/2014 | Sato et al. |
| 2014/0049601 A1 | 2/2014 | Pfeil |
| 2014/0139655 A1 | 5/2014 | Mimar |
| 2014/0195477 A1 | 7/2014 | Graumann et al. |
| 2014/0210625 A1 | 7/2014 | Nemat-nasser |
| 2014/0210978 A1 | 7/2014 | Gunaratne et al. |
| 2014/0214255 A1 | 7/2014 | Dolgov et al. |
| 2014/0267703 A1 | 9/2014 | Taylor et al. |
| 2014/0324281 A1 | 10/2014 | Nemat-nasser et al. |
| 2015/0084757 A1 | 3/2015 | Annibale et al. |
| 2015/0086078 A1 | 3/2015 | Sibiryakov |
| 2015/0161892 A1 | 6/2015 | Oremus |
| 2015/0219462 A1 | 8/2015 | Stmper |
| 2015/0269438 A1 | 9/2015 | Samarasekera et al. |
| 2015/0274161 A1 | 10/2015 | Stierlin |
| 2015/0344030 A1 | 12/2015 | Damerow et al. |
| 2015/0375756 A1 | 12/2015 | Do et al. |
| 2015/0379715 A1 | 12/2015 | Chandrasekar et al. |
| 2016/0086021 A1 | 3/2016 | Grohman et al. |
| 2016/0147230 A1 | 5/2016 | Munich et al. |
| 2016/0163198 A1 | 6/2016 | Dougherty |
| 2016/0203373 A1 | 7/2016 | Menashe et al. |
| 2016/0244022 A1 | 8/2016 | Lippman et al. |
| 2016/0267335 A1 | 9/2016 | Hampiholi |
| 2016/0300242 A1 | 10/2016 | Truong et al. |
| 2016/0335475 A1 | 11/2016 | Krenzer et al. |
| 2016/0339782 A1 | 11/2016 | Seong et al. |
| 2017/0048239 A1 | 2/2017 | Jeon et al. |
| 2017/0053167 A1 | 2/2017 | Ren et al. |
| 2017/0053461 A1 | 2/2017 | Pal et al. |
| 2017/0053555 A1 | 2/2017 | Angel et al. |
| 2017/0055868 A1 | 3/2017 | Hatakeyama |
| 2017/0061222 A1 | 3/2017 | Hoye et al. |
| 2017/0080900 A1 | 3/2017 | Huennekens et al. |
| 2017/0088142 A1 | 3/2017 | Hunt et al. |
| 2017/0101093 A1 | 4/2017 | Barfield et al. |
| 2017/0109828 A1 | 4/2017 | Pierce et al. |
| 2017/0140231 A1 | 5/2017 | Chen |
| 2017/0248952 A1 | 8/2017 | Perkins et al. |
| 2017/0287163 A1 | 10/2017 | Kaufmann |
| 2017/0314954 A1 | 11/2017 | Golding et al. |
| 2018/0043829 A1 | 2/2018 | Cordell et al. |
| 2018/0052515 A1 | 2/2018 | Wanner et al. |

FOREIGN PATENT DOCUMENTS

| | | |
|---|---|---|
| GB | 2506365 A | 4/2014 |
| WO | 2015184578 A1 | 12/2015 |
| WO | 2018039560 A1 | 3/2018 |

OTHER PUBLICATIONS

Guo et al. "Evaluating the Relationship Between Near-Crashes and Crashes: Can Near-Crashes Serve as a Surrogate Safety Metric for Crashes?", DOT HS 811 382 Oct. 2010 Virginia Tech Transportation Institute, U.S. Department of Transportation, Sep. 2010, Nov. 6, 2017 (Part 1 of 2).

SYSTEM AND METHOD FOR CONTEXTUALIZED VEHICLE OPERATION DETERMINATION

CROSS REFERENCE TO RELATED APPLICATIONS

This application claims the benefit of U.S. patent application Ser. No. 16/011,437, filed Jun. 18, 2018, which claims the benefit of U.S. provisional patent application Ser. No. 62/521,091, filed Jun. 16, 2017, which are incorporated herein in their entirety by this reference thereto.

TECHNICAL FIELD

This invention relates generally to the automotive analysis field, and more specifically to a new and useful system and method for contextualized vehicle operation determination in the automotive analysis field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 1:
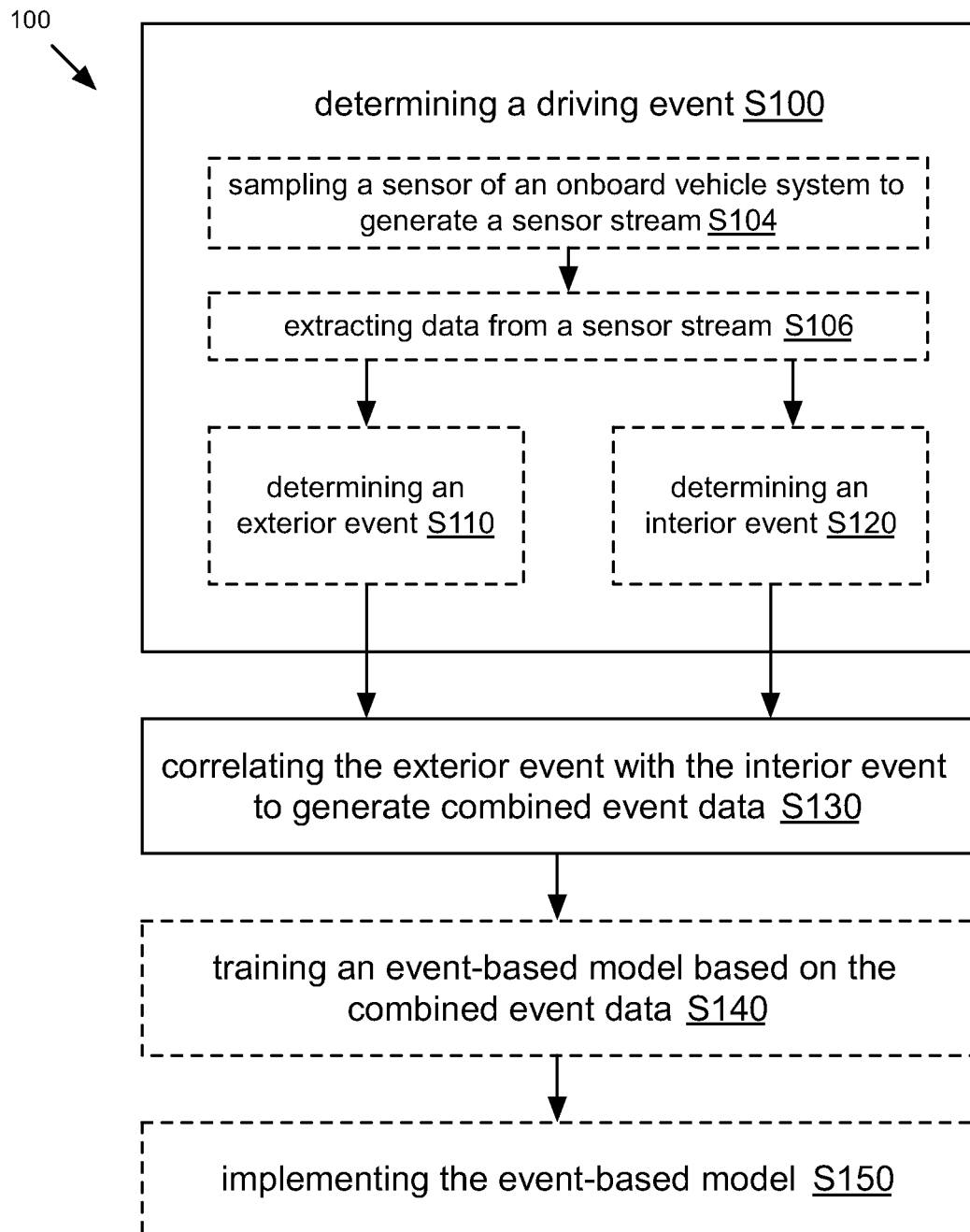
FIG. 1 is a flowchart representation of a variation of the method.

As shown in FIG. 1, the method 100 for contextualized vehicle operation determination includes: determining a driving event S100, which can include sampling a sensor of an onboard vehicle system to generate a sensor stream S104, extracting data from a sensor stream S106, determining an exterior event S110, and determining an interior event S120; and correlating the exterior event with the interior event to generate combined event data S130. The method can optionally include: training an event-based model based on the combined event data S140; and implementing the event-based model S150.

The method functions to collect real-world data associating events related to vehicle operation with events related to the context in which the vehicle is operated. The method can also function to associate external driving conditions with intrinsic vehicle operation. The method can also function to train autonomous vehicle models which can be used for autonomous vehicle control, determination of vehicle maintenance requirements, determination of insurance claim information, and/or used for other driving-related analyses. The method can also function to generate models that correlate (e.g., spatially, causally, temporally, etc.): vehicle control inputs, vehicle contextual information, vehicle operation, exterior events, interior events, and other vehicle-related information (e.g., driver behavior, driver distraction, etc.) with one another in any suitable correlated combination.

The method and/or variations thereof can be performed by and/or implemented at various related systems. The method is preferably performed for a physical vehicle traversing through a physical volume, but can additionally or alternatively be performed for a virtual model (e.g., of a vehicle), a simulated vehicle, or otherwise suitably performed. The physical vehicle can be an automobile, a motorcycle, a velocipede (e.g., a bicycle, a tricycle, etc.), a skateboard, an aerial system (e.g., a drone, plane, etc.), or be any other suitable vehicle. The vehicle can be driven by a human driver, be automatically controlled (e.g., by an onboard computer system executing an autonomous vehicle control model), be telematically controlled (e.g., by a teleoperator, by a remote computing system, etc.), or be otherwise suitably controlled. The method is preferably performed for a single vehicle, but can additionally or alternatively be performed for a plurality of vehicles, a pair of vehicles involved in a vehicle event (e.g., in a crash, in a near-miss, etc.), and/or any other suitable number and/or grouping of vehicles. The vehicle preferably includes one or more sensors (e.g., permanently integrated with the vehicle, installed in a removable dashboard-mounted or windshield-mounted module, integrated into a mountable unit coupled to the vehicle at a single interior or exterior location, etc.), a power system, an onboard processing system (e.g., a vehicle computer), a memory system (e.g., onboard flash memory storage), and a communication module. However, the vehicle can include any other suitable subsystems and/or components, either integrated into the vehicle (e.g., during manufacturing, as an aftermarket add on, etc.), coupled to a removable module (e.g., a mobile device, a dashboard-mounted system, etc.), and/or otherwise suitably associated with the vehicle.

Figure 2:
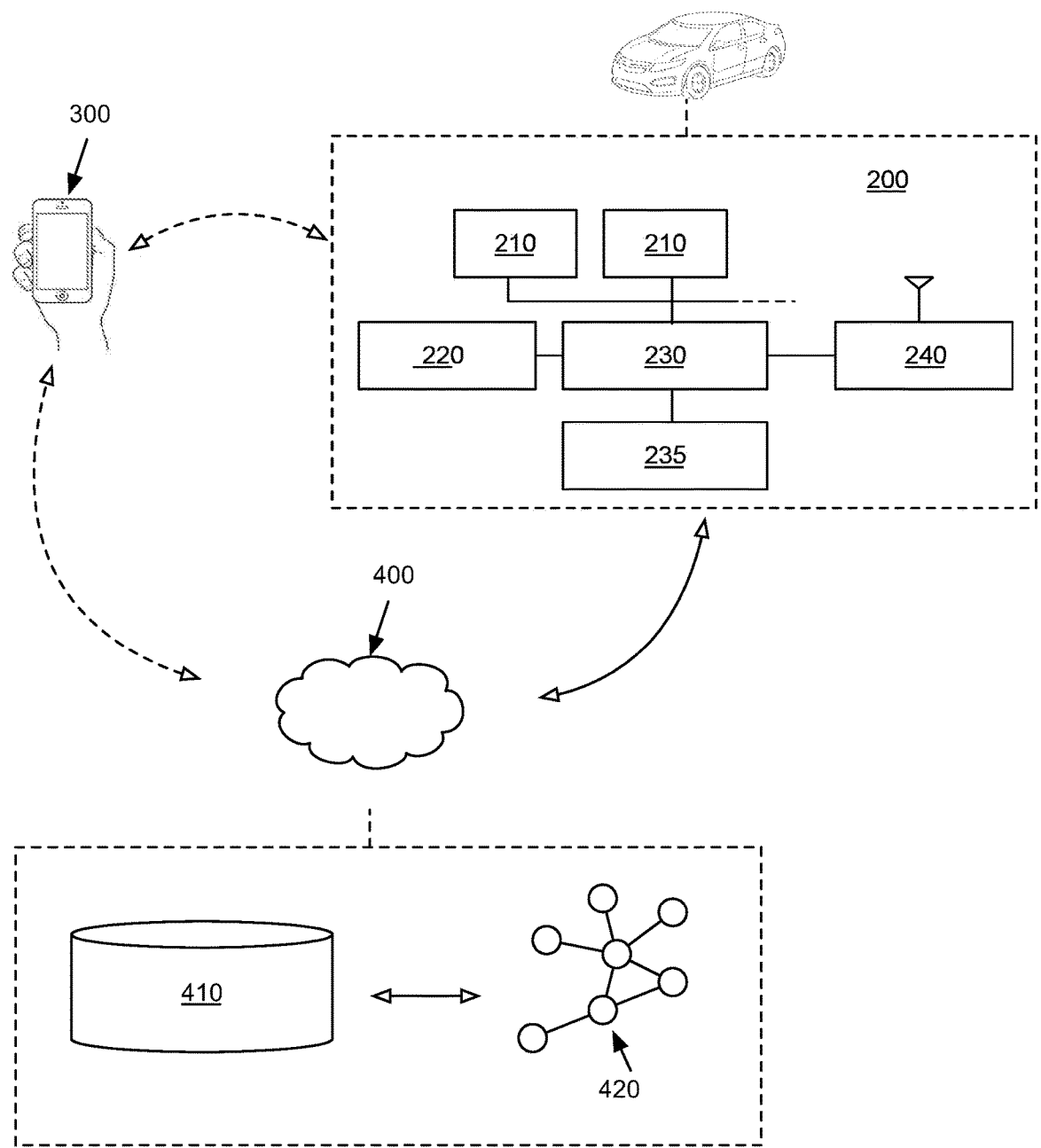
FIG. 2 is a flowchart depiction of an example implementation of the systems and method.

As shown in FIG. 2, the method is preferably implemented at least partially at an onboard vehicle system 200, which includes one or more sensors 210 (e.g., optical sensors, audio sensors, stereocameras, stereomicrophones, inertial sensors, accelerometers, magnetometers, gyroscopes, ambient light sensors, etc.). The onboard vehicle system 200 can also include a power system 220, a processing system 230 including a memory 235, and a communication system 240. The onboard vehicle system is preferably arranged proximal the dashboard of the vehicle (e.g., mounted atop the dashboard, coupled to the inner surface of the windshield, etc.), but can be otherwise suitably arranged. The onboard vehicle system is preferably separate from the vehicle (e.g., installed into the vehicle, removable from and/or installable into the vehicle by the user or related entity, etc.), but can alternatively be integrated into the vehicle or otherwise permanently or semi-permanently attached to the vehicle. The method can also be implemented at and/or executed in conjunction with a user device 300 and/or a remote computing system 400. The user device 300 can include a mobile device associated with the user (e.g., a smartphone, tablet, laptop, etc.) and any other suitable device. The remote computing system 400 preferably includes a database 410 and analysis modules 420. The remote computing system 400 can execute any suitable Blocks or portions of the method 100 (e.g., at one or more analysis modules 420).

Figure 3:
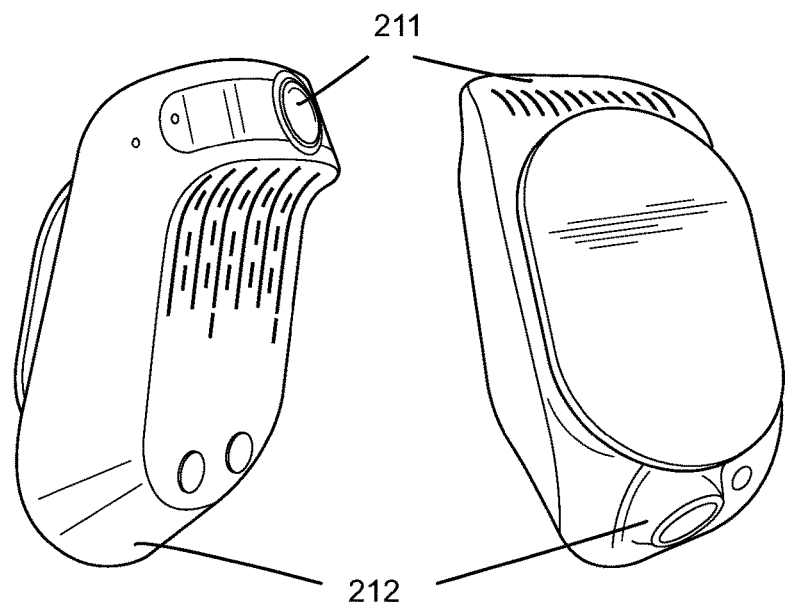
FIG. 3 is a perspective view of an example embodiment of an onboard vehicle system of the system.

As shown by example in FIG. 3, the onboard vehicle system preferably includes at least one outward facing (e.g., exterior-facing) camera 211 (e.g., directed toward the front of the vehicle through the front windshield) and at least one inward facing (e.g., interior facing) camera 212 (e.g., directed in a substantially opposite direction as the forward facing camera); however, the onboard vehicle system can include any suitable number of cameras directed in any suitable direction. The cameras are preferably video cameras that collect image streams (e.g., sequences of images), but can additionally or alternatively include single-frame cameras that collect images in an ad hoc or any other suitable manner (e.g., based on a capture trigger, in bursts of frames, etc.). The cameras can each be: monocular cameras (e.g., CCD image sensors, CMOS image sensors), stereocameras, hyperspectral cameras, multispectral cameras, or any suitable camera. One or more intrinsic parameters for each camera (e.g., focal length, skew coefficient, pixel skew, image sensor format, principal point (e.g., optical center), distortion (e.g., radial distortion, tangential distortion) can be known (e.g., determined from the manufacturer, calibrated, etc.), estimated, or otherwise determined. One or more extrinsic parameters for each camera (e.g., pose, rotation, translation, heading, camera center position, etc. relative to a housing, another camera, a global reference point, a vehicle reference point, etc.) can be known (e.g., determined from the manufacturer, calibrated, etc.), estimated, or otherwise determined. The relationship between the cameras (e.g., separation distance; separation angle; relative pose, rotation, altitude; etc.) can be determined through calibration, by tracking visual features shared between the interior and exterior camera feeds (e.g., through sequential image frames), by using a shared housing (e.g., wherein the cameras can be statically mounted to a rigid housing with known dimensions and/or mounting points), or otherwise determined. The relative spatial orientation is preferably determined (e.g., calculated, estimated, harcoded, etc.) based on the relationship between the cameras, but can be otherwise determined. The aforementioned information (e.g., intrinsic parameters, extrinsic parameters, relative positioning, relative orientation, etc.) can be stored: onboard, in the remote computing system, in the user device, or otherwise stored. The cameras can be connected to (and operate based on) the same clock (e.g., onboard clock, GPS clock, etc.), synchronized clocks, unsynchronized clocks, or any other suitable clock. The onboard vehicle system can include a processor (e.g., CPU, GPU, etc.), which can, in variations, implement machine learning models and/or modules (e.g., a convolutional neural network-based model) and/or portions thereof. The processor can also receive, transmit, and/or process data (e.g., in cooperation with a communication subsystem of the onboard vehicle system). The onboard vehicle system can include any suitable outputs, such as a speaker, a vibration mechanism (e.g., haptic output), a display, and/or any other suitable output mechanisms. The onboard vehicle system can also include a communication subsystem (e.g., for long and/or medium range communication such as cellular or Wi-Fi, short range communication such as Bluetooth Low-Energy or near field communications, direct wired communication such as a connection to a CAN bus of the vehicle, etc.), a location system (e.g., GPS, cellular trilateration system, etc.), and/or a power system (e.g., a battery, a connector for connecting the system to vehicle-generated electricity, etc.). The onboard vehicle system is preferably self-contained in a single mountable unit enclosed by a housing, as shown by example in FIG. 3, but can additionally or alternatively include components arranged in a distributed or any other suitable manner.

The relative spatial orientation between the inward and outward facing cameras (and/or the respective fields of view of the cameras) is preferably known (e.g., within a threshold degree of certainty), such that the location of features detectable in the images recorded by the outward facing camera or cameras can be determined relative to the location of features detectable in the images recorded by the inward facing camera or cameras (e.g., in order to determine a gaze parameter, such as a gaze vector, a gaze region, etc.; determine a focal point based on the gaze region and pupil dilation, a point in space at which an occupant's or driver's gaze is directed; to determine that the right portion of the field of view of the outward facing camera is correlated with the left portion of the field of view of the inward facing camera; etc.). The known relative spatial orientation is preferably stored and/or encoded into the onboard vehicle system (e.g., a processor thereof), such that the information (e.g., the known relative spatial orientation, derived quantities thereof, etc.) are usable by the onboard vehicle system in various computations and/or other suitable determinations (e.g., implementations of various Blocks of the method 100). The relative spatial orientation can be determined using a pixel map (e.g., correlating one or more of the outward camera pixels with one or more of the inward camera pixels; correlating the relative positions of the outward and inward pixels; storing a vector between the outward and inward pixel, etc.), region map (e.g., correlating one or more of the outward camera field of view regions with one or more of the inward camera regions), edge map (e.g., correlating one or more of the outward camera edges or reference points with one or more of the inward camera edges or reference points) the geometry of the mounting point(s) of the onboard vehicle system combined with the geometry of the onboard vehicle system itself (e.g., camera relationships, extrinsic parameters), and/or by any other suitable means. In a first variation, the inward and outward facing cameras are statically mounted to the same housing, and thus the relative positions of the inward and outward facing cameras are statically determined. In a second variation, the inward and outward facing cameras are mobile within the housing but mutually rigidly coupled, such that tracking the position of either the inward facing camera, the outward facing camera, or both the inward and outward facing cameras allows a pixel map between the imagery of one camera and the imagery of the other camera to be regenerated based on the position. In a third variation, the inward and outward facing cameras are independently movable (e.g., separate and distinct systems), and the relative spatial orientation and/or pixel mapping is determined automatically (e.g., based on optical angle of arrival, optical fiducials detecting in video streams of the respective cameras, etc.). Data streams (e.g., video streams, lidar streams, gyroscope streams, IMU streams, etc.) from both the inward and outward facing cameras can be temporally synchronized (e.g., via a shared internal clock and/or synchronized clocks).

The onboard vehicle system can include adjustable mounting heights between an internal vehicle surface and the plane of cameras of the onboard vehicle system; alternatively, the mounting heights can be fixed. Likewise, the onboard vehicle system preferably includes an adjustable mounting angle between optical axes of cameras of the onboard vehicle system and a plane defined by the wheelbase of the vehicle; alternatively, the mounting angle can be fixed. The onboard vehicle system can have any suitable form factor, such as an integrated, compact form factor as shown in FIG. 3 or any other suitable form factor. In variations of the onboard vehicle system wherein mounting heights and/or angles are adjustable, the onboard vehicle system can include a feedback mechanism (e.g., a digital position encoder, an angle encoder, etc.) to report the mounting heights and/or angles to a processor (e.g., controller) of the onboard vehicle system for use in determining the relative orientation between cameras. However, the onboard vehicle system can additionally or alternatively store a predetermined set of relative orientations associated with various allowable (e.g., mechanically allowable, permissible in software, etc.) adjustable positions (e.g., heights, angles, etc.) of the cameras or other sensors of the onboard vehicle system.

The onboard vehicle system can be operable between various operating modes, including an automatic calibration mode. In the automatic calibration mode, the onboard vehicle system adapts to the geometry, behavior, and other characteristics of a particular vehicle in order to calibrate the sensors of the onboard vehicle system. For example, the automatic calibration mode can include performing baseline measurements of sound, imagery, and other suitable background data to enable differential measurements (e.g., departures from the baseline measurements). In this example, performing baseline measurements can include automatically detecting and eliminating A-pillars, the vehicle hood, and other objects (e.g., that do not move substantially relative to the camera of the onboard vehicle system while the vehicle is in motion); measuring baseline audio levels (e.g., background noise, engine noise, periodic and/or non-periodic audible sounds emitted by vehicle components, etc.); and any other suitable measurements of steady, quasi-steady, and any other suitable measurable parameters.

Variations of the method and/or portions thereof are preferably performed at least partially at a remote computing system (e.g., a remote server), which can include one or more databases (e.g., for storing data and/or from which to retrieve data) and analysis modules (e.g., for performing any Blocks of the method and/or variations and examples thereof). Various blocks of the method can be performed in cooperation with a mobile device associated with an occupant of the vehicle (e.g., an occupant device, a user device, a phone of the user wherein the user is a passenger or driver, etc.) or with another entity. However, the method and/or portions thereof can be otherwise suitably performed with any suitable system(s).

In examples, Blocks S110-S150 and/or other portions of the method can employ machine learning approaches including any one or more of: supervised learning (e.g., using logistic regression, using back propagation neural networks, using random forests, decision trees, etc.), unsupervised learning (e.g., using an a priori algorithm, using K-means clustering), semi-supervised learning, reinforcement learning (e.g., using a Q-learning algorithm, using temporal difference learning), a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an a priori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, boostrapped aggregation, AdaBoost, stacked generalization, gradient boosting machine method, random forest method, etc.), and/or any suitable form of machine learning algorithm.

Data collected and/or generated by the method is preferably transferred (and/or created at) a remote computing system, but can alternatively be transferred between any suitable computing systems (e.g., including an onboard computer, VCU, mobile device within and/or linked to the vehicle, etc.).

The method is preferably performed continuously in real- or near-real time; however, the method can additionally or alternatively be performed in response to occurrence of a trigger event (e.g., a change in the baseline state of the vehicle, activation of the vehicle and/or onboard vehicle system by a user, detection of an occupant entering the vehicle, detection or identification of a driver, a determination that a driving event such as a collision or near-miss has occurred, etc.), iteratively performed at a predetermined frequency (e.g., every millisecond), performed a single time during a driving session, performed a single time for a particular vehicle, and/or performed with any other suitable temporal characteristics.

2. Benefits

Variants of the systems and/or methods can confer several benefits and/or advantages.

First, variants of the method can create a dataset derived from real-world events (e.g., non-simulated events) that can be used to train autonomous vehicle control models. Such datasets can include a clean (e.g., structured, labeled, pre-classified, categorized, devoid of false positives or false negatives, etc.) set of skilled driving actions and/or vehicle operations (e.g., actions and/or operations that comply with traffic guidelines, avoid adverse vehicle events, etc.) in various driving contexts (e.g., weather conditions, traffic conditions, time periods, etc.), that can be used to train autonomous vehicle control models. Such datasets can additionally or alternatively include a set of examples of unskilled driving behavior and/or vehicle operations in various driving contexts (e.g., to filter other datasets for actions and/or operations that do not comply with traffic guidelines, avoid adverse vehicle events, to provide a labeled set of false positives relative to skilled driving, etc.).

Second, variants of the method can automatically weight gathered training data for generating and training autonomous vehicle control models. Automatic weighting can include determining a score associated with a quality of vehicle operational data based on driver behavior, as well as associating vehicle operational data with a particular driver and/or other individual.

Third, variants of the method can include determining occupant characteristics to associate with vehicle operational data. Such characteristics can include driver identifying information, driver history (e.g., accident history, automotive insurance premium history, etc.), number of vehicle occupants (e.g., to determine driving weight of the vehicle; can be determined from video streams, estimated suspension ride height, etc.).

Fourth, variants of the method can enable monitoring of driver behavior (e.g., to ensure drivers in a commercial fleet of vehicles are driving appropriately).

Fifth, variants of the method can enable automatic determination of intrinsic characteristics of a vehicle in which the onboard vehicle system is installed. Intrinsic characteristics can include a vehicle make, a vehicle model, and other vehicle information (e.g., from pattern-matching of interior images to a database of vehicle interiors organized by make and model). Intrinsic characteristics can include dynamically changing information, such as emergent maintenance issues (e.g., abnormal noises, vibrations, etc.).

Sixth, variants of the system and the method implemented thereby can be used across a wide variety of vehicles (e.g., can be installed after-market and/or by the end user in any suitable vehicle), enabling the augmentation of any suitably functional vehicle with automotive analysis capabilities provided by the systems and methods and variations thereof.

Seventh, variants of the method can enable temporal correlation of interior events with exterior events to generate combined event data that is enriched with the context provided (e.g., by the exterior event to the interior event, by the interior event to the exterior event, etc.). For example, an interior event can include the widening of a driver's eyes and the exterior event can include the activation of the brake lights of a leading vehicle, and correlating the interior event with the exterior event can include associating the widening of the driver's eyes with the activation of the brake lights in time (e.g., temporally associating), and the method can include generating combined event data that includes an indication that the driver visibly responded to the brake light activation and a calculation of the driver's response time.

Eighth, variants of the method can enable geometric correlation of interior events with exterior events to generate combined event data. For example, an interior event can include a driver's gaze direction meeting a directional criterion (e.g., the gaze being apparently directed to a particular location as determined from an interior image) and the exterior event can include an object external to the vehicle meeting another criterion (e.g., entering a region of space proximal to the vehicle as determined from an exterior image), and correlating the interior event with the exterior event can include determining that the driver directed his or her gaze toward the external object within a predetermined time window relative to the external object meeting the criterion. In such variants and examples, the geometric correlation of the interior event and the exterior event is preferably based on intrinsic relationships (e.g., orientations, mounting positions, etc.) between sensors (e.g., interior- and exterior-facing cameras) of the onboard vehicle system that enables computation of relative perspectives and positions between sensor outputs (e.g., images). However, geometric correlation can be otherwise suitably performed and result in any suitable combined event data.

Ninth, variants of the method can enable semantic correlation of interior events with exterior events to generate combined event data. For example, an interior event can include a driver distraction event (e.g., a cognitive distraction event, a look-down event, a look-away event, a mobile device interaction, a vehicle console interaction, etc.) and the exterior event can include a lane drift event, and the combined event data can include an assignment of causality to the interior event (e.g., labeling the exterior event with a cause that includes the interior event).

However, variants of the systems and/or methods can confer any other suitable benefits and/or advantages.

3. Method

As shown in FIG. 1, the method 100 for correlating interior and exterior driving events includes: determining a driving event S100, which includes determining an exterior event S110, and determining an interior event S120; and correlating the exterior event with the interior event to generate combined event data S130. The method 100 and Blocks of the method 100 can also include: sampling a data stream at a sensor of an onboard vehicle system S104; extracting activity data from a data stream S106; transmitting data between an onboard system and a remote computing system S135; training an event-based model based on the combined event data S140; and implementing the event-based model S150.

Block S100 includes determining a driving event. Block S100 functions to determine the occurrence of an event related to driving (e.g., that a driving event has occurred, is occurring, will occur, etc.). Block S100 can also function to monitor (e.g., continuously, periodically) vehicle operation. Block S100 can also function to track vehicle usage.

Figure 4:
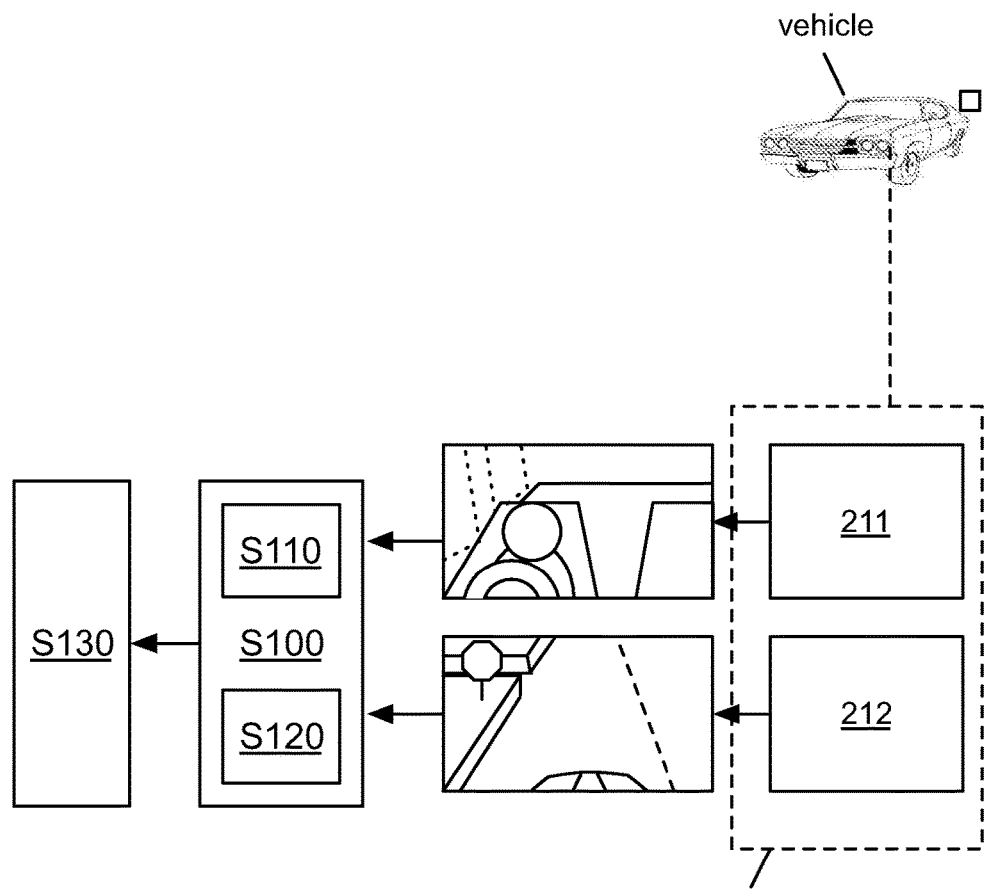
FIG. 4 is a flowchart representation of a variation of a portion of an example implementation of the method.

Block S100 can include Block S104, which includes: sampling a data stream at a sensor of an onboard vehicle system. Block S104 functions to gather raw sensor data from the vehicle and/or the vicinity of the vehicle (e.g., vehicle interior, vehicle exterior, etc.). Vehicle sensor data that is collectively composed of one or more data streams preferably includes two-way video data (e.g., inward facing video camera data and outward facing video camera data), and can also include inertial data, gyroscope data, location data, routing data, kinematic data, and other suitable vehicle telemetry data (e.g., collected from an OBD II port via a suitable data connection). However, vehicle sensor data can include any other suitable data. As shown in FIG. 4, collecting vehicle sensor data can also, in variations, include collecting geometrically related data streams (e.g., collecting image data streams including pixels of inward facing camera data spatially mapped to pixels of outward facing camera data), for use in subsequent Blocks of the method. Collecting vehicle sensor data can include sampling at sensors of a sensor system (e.g., onboard vehicle system), receiving sensor data from the vehicle, and/or otherwise suitably collecting sensor data. Any suitable number of sensor streams (e.g., data streams) can be sampled, and sensors can be of various types (e.g., interior IMU sensors and exterior-facing cameras in conjunction, interior and exterior facing cameras in conjunction, etc.).

In relation to Block S104, sampling can be performed within a time window (e.g., over a time period). Sampling can also be performed among multiple sensors, in parallel and/or serially in any suitable combination (e.g., wherein a subset of sensor streams are collected in parallel, and another subset of sensor streams are collected serially and/or asynchronously). Sampling can be performed within overlapping time windows at various sensors (e.g., partially overlapping, completely overlapping, wherein time windows are coextensive, partially coextensive, etc.). In a specific example, Block S104 includes sampling a first image stream within a first time window at an interior-facing camera of an onboard vehicle system, wherein the onboard vehicle system is integrated into a mountable unit coupled to a vehicle at a single interior location and sampling a second image stream within a second time window at an exterior-facing camera of the onboard vehicle system, wherein the first and second time period are coextensive.

Block S100 can include Block S106, which includes: extracting activity data from a data stream. Block S106 functions to process the raw sensor data and derive (e.g., extract) parameters and/or characteristics that are related to driving events, and/or from which driving events can be determined in relation to Block S100 and/or portions thereof. Extracting vehicle operational data can be performed by implementing a set of rules in the form of a model, such as an artificial neural network (e.g., a convolutional neural network), Bayesian model, a deterministic model, a stochastic and/or probabilistic model, and any other suitable model (e.g., any suitable machine learning as described above). Extracting vehicle operational data is preferably performed onboard the vehicle (e.g., at an onboard vehicle system, a vehicle computing unit, an electronic control unit, a processor of the onboard vehicle system, a mobile device onboard the vehicle, etc.), but can additionally or alternatively be performed at a remote computing system subsequent to (and/or simultaneously with) transmission of vehicle sensor data to the remote computing system (e.g., over a cellular radio channel).

In a first variation, extracting activity data using a model includes determining that a combination of sampled measurement values substantially matches a predetermined pattern indicative of known vehicle operational behavior (e.g., performing curve fitting on a curve of acceleration versus time curve to identify a predetermined pattern and/or a set of curve features known to correspond to a vehicle turning through a certain subtended angle). In a second variation, extracting vehicle operational data includes translating data received from an OBD II port of the vehicle (e.g., using a lookup table). In a third variation, extracting vehicle operational data includes determining vehicle speed and direction by implementing a set of rules that track road markings and/or landmarks in collected imagery as the markings and/or landmarks move through a sequence of image frames (e.g., using optical flow image processing algorithms). In a fourth variation, extracting vehicle operational data includes determining the location of the vehicle by combining GPS and IMU information (e.g., using IMU data used for dead-reckoning localization). In a fifth variation, extracting vehicle operational data includes estimating a vehicle speed and/or acceleration based on microphone measurements of an audible vehicle parameter (e.g., an engine revolution parameter or revolutions per minute, a road noise parameter or decibel level of background noise, etc.). In a sixth variation, extracting vehicle operational data includes measuring a vibration parameter (e.g., frequency, amplitude, time dependency) of the vehicle using an IMU (e.g., of the onboard vehicle system). However, extracting vehicle operational data can include otherwise suitably determining vehicle operational data based on vehicle sensor data.

In relation to Block S106, extracting data can include extracting interior activity data. Extracting interior activity data includes extracting data from a data stream (e.g., an image stream, a gyroscopic data stream, an IMU data stream, etc.) that encodes information concerning activities occurring within a vehicle interior. Such interior activity data can include driver activity (e.g., driver gaze motion, driver hand positions, driver control inputs, etc.), passenger activity (e.g., passenger conversation content, passenger speaking volume, passenger speaking time points, etc.), vehicle interior qualities (e.g., overall noise level, ambient light level within the cabin, etc.), intrinsic vehicle information perceptible from within the vehicle (e.g., vibration, acoustic signatures, interior appointments such as upholstery colors or materials, etc.), and any other suitable activity data related to the vehicle interior and/or collected from within the vehicle (e.g., at the onboard vehicle system).

In a variation, Block S106 includes extracting interior activity data from an image stream sampled at an interior facing camera of an onboard vehicle system. In a specific example of this variation, Block S106 includes extracting a driver gaze direction as a function of time from the image stream sampled over a time window. The output of Block S106 in this example can include a time series of coordinates in two- or three-dimensional space, wherein the coordinate at each time represents a most-probable location of the center of the driver's gaze. In this example and related examples, the coordinate can be mapped onto a pixel or pixels of an image from an image stream associated with an exterior facing camera. Such mapping is preferably performed based on known geometric relationships between interior and exterior cameras, but can be otherwise suitably performed (e.g., in accordance with one or more variations of Block S130).

In another variation, Block S106 includes extracting interior activity data from gyroscope data. For example, extracting interior activity data can include determining a mean time interval between steering inputs (e.g., by the driver) based on the gyroscope data.

In relation to Block S106, extracting data can include extracting exterior activity data. Extracting exterior activity data includes extracting data from a data stream (e.g., an image stream, a gyroscopic data stream, an IMU data stream, etc.) that encodes information concerning activities occurring outside a vehicle. Such exterior activity data can include data related to driver actions (e.g., following distance, lane drift, lane changes, turning, braking, braking rate, slowing and/or stopping distance, reaction of the vehicle to control inputs by the driver, etc.), external object activity (e.g., relative distances between the vehicle and external objects such as other vehicles, pedestrians, lane lines, traffic signage and signals, roadway features, etc.), vehicle exterior qualities (e.g., external noise level, ambient light level outside the cabin, audio signatures from surroundings such as sirens, visible signatures from surroundings such as brake lights, headlights, etc.), intrinsic vehicle information perceptible from views of a scene external to the vehicle (e.g., exterior panel vibration, acoustic signatures, images viewable in mirrors such as a rearview mirror, exterior vehicle characteristics such as paint colors or aftermarket components, etc.), and any other suitable activity data related to the vehicle exterior and/or collected by a sensor that can detect aspects of the environment external to the vehicle (e.g., at the onboard vehicle system).

In a variation, Block S106 includes extracting exterior activity data from an image stream (exterior image(s)) sampled at an exterior facing camera of an onboard vehicle system. Extracting exterior activity data can include identifying blobs, object edges, object state (e.g., red traffic light, green traffic light, etc.), or other object features (e.g., gradients, pose, distance, etc.) from the exterior image; determining object types, object kinematics, object trajectories, multi-object interactions, or other object parameters from the exterior image, ambient environment data, or extracting any other suitable information from one or more exterior images (e.g., time series of exterior images). In a specific example of this variation, extracting the exterior activity data includes determining (e.g., computing) a relative position between the vehicle and an object depicted in the image stream (e.g., within a time window). The output of Block S106 in this example includes a time series of coordinates, wherein each of the set of coordinates defines an outline of the object in the image stream and the relative distance between the vehicle and each point of the outline of the object. However, the output of Block S106 can additionally or alternatively include any other suitable output.

In relation to Block S100, determining event data (e.g., an exterior event, an interior event, etc.) can include determining vehicle operation data in relation to a driving event. Vehicle operation data is preferably data related to vehicle operation (e.g., characteristics of the vehicle while the vehicle is operated and/or driven), but can additionally or alternatively include any other suitable data. Vehicle operational data can include vehicle outputs (e.g., engine output power, transmission gear state, throttle and/or accelerator pedal position, fuel injection parameters, voltage and/or current values of any vehicle components operating on electrical power, brake lever position, brake pedal position, brake caliper position, etc.), vehicle kinematics (e.g., acceleration, velocity, position, planned traversal path, current traversal path, past traversal path, trajectory, etc.), vehicle inputs (e.g., accelerator pedal position, steering wheel position, gear shifter position, etc.), driver parameters (e.g., whether the driver is distracted or not, a distraction level of a distracted driver, a head position of a driver, etc.), vehicle cabin parameters (e.g., noise levels, number of passengers in the vehicle, etc.), and any other suitable data related to the operation of a vehicle. Block S110 can include collecting vehicle sensor data and extracting vehicle operational data from vehicle sensor data, which can be performed substantially simultaneously, sequentially, or with any other suitable relative temporal characteristics.

Block S100 is preferably performed by an onboard vehicle system such as that described above, but can alternatively be performed by or at any suitable system or combination of systems. Block S100 preferably includes collecting at least exterior image data and telemetry data, but can additionally or alternatively include collecting interior image data and any other suitable data.

Block S100 is preferably performed continuously in real- or near-real time during vehicle operation, but can additionally or alternatively be performed when the vehicle and/or installed onboard vehicle system is activated by an occupant of the vehicle and/or remote operator (e.g., when a fleet manager activates the vehicle operational data determination process by remotely activating the sensor system, sending a text message to the vehicle driver prompting the driver to activate the sensor system, etc.). For example, Block S100 can include constantly recording video streams from both inwardly and outwardly directed video cameras, and maintaining a buffer (e.g., a 10 minute buffer, a 20 minute buffer, a 5 hour buffer, an adjustable buffer, lossless storage of all video data, transmission and/or streaming of video data off-board the vehicle, etc.) of video streams. Additionally or alternatively, Block S100 can be performed in response to a user input (e.g., a user pressing a record button of the onboard vehicle system), be performed periodically and/or asynchronously, and/or be performed with any other suitable temporal characteristics.

In relation to Block S100, determining event data can include determining vehicle context data. Vehicle context data is preferably information indicative of the ambient environment of the vehicle during operation. Block S100 can include collecting environmental data, determining vehicle context data from the environmental data, and can optionally include determining intrinsic vehicle data, each of which can be performed substantially concurrently and/or asynchronously performed.

Collecting environmental data functions to gather information (e.g., environmental parameters, environmental data) indicative of the physical environment surrounding the vehicle. The environmental data can be included in a resultant training data set, used to select analysis modules (e.g., different analysis modules are selected for different times of day or ambient lighting levels), or otherwise used. Such information can include ambient weather, temperature, pressure, light levels, noise levels, and any other suitable ambient environmental data. Environmental data can include nearby obstacles (e.g., static, moving) in the vicinity of the vehicle, such as curbs, other vehicles, pedestrians, non-automotive vehicles (e.g., bicycles, skateboards, etc.), and any other suitable obstacles. Environmental data can also include parameters associated with such obstacles, such as a number of obstacles (e.g., a number of cars within a threshold distance of the vehicle), trajectories of obstacles, and any other suitable parameters. Collecting can include sampling at the onboard vehicle system, retrieving from a remote database, receiving from adjacent and/or nearby vehicles (e.g., in front of the vehicle containing the onboard vehicle system, behind the vehicle, etc.).

In a first variation, collecting environmental data includes measuring ambient weather parameters (e.g., precipitation level and/or classification, visibility, temperature, ambient light level, etc.) using sensors of the onboard vehicle system. However, collecting environmental data can include determining any other suitable data.

Determining the vehicle context data based on the environmental data functions to obtain data that contextualizes the vehicle operational data, for provision to subsequent blocks of the method. Determining the vehicle context data can include extracting the vehicle context data (e.g., via image processing techniques, via any suitable extraction as described above in relation to Block S106) to generate a set of objects and/or object parameters based on the environmental data (e.g., raindrops, opacity parameters related to visibility, etc.). Determining the vehicle context data can also include foreground and background segmentation, object recognition and classification, optical flow analyses, and/or any other suitable data analysis processes.

In relation to Block S100, intrinsic vehicle data is preferably data indicative of intrinsic characteristics of the vehicle (e.g., data that identifies the vehicle, data that are related to the nature of the vehicle versus the operational qualities of the vehicle, etc.). Intrinsic vehicle data can include vehicle identity data, such as a VIN and/or any other suitable identifying data (e.g., a make and model of the vehicle). Vehicle identity data can be associated with a user device in a database and thereby determined (e.g., retrieved), entered manually by a user (e.g., at a previous time point to execution of determining the intrinsic vehicle data and stored in a user profile for subsequent retrieval, etc.), and/or otherwise suitably designated and determined. Determining intrinsic vehicle data can include retrieving a vehicle maintenance history report (e.g., using an API and in combination with a VIN lookup), and/or otherwise suitably determining any suitable intrinsic vehicle data.

Block S100 can include determining a near-miss event (e.g., wherein the event data is associated with a near-miss). A near-miss event (e.g., as determined in variations of Block S100 and/or other portions of the method 100 and Blocks thereof) is preferably a near-miss event (e.g., near-crash, near-collision, etc.) determined substantially as described in U.S. application Ser. No. 15/892,899, titled "System and Methods for Near-Crash Determination" and filed 9 Feb. 2018, which is incorporated herein in its entirety by this reference. However, a near-miss event can additionally or alternatively include any other suitable driving event and/or be otherwise suitably determined.

Block S100 can optionally include Block S105, which includes determining driver behavior. Block S105 functions to determine actions taken by the driver while operating the vehicle (e.g., driving the vehicle, occupying the vehicle while the vehicle is running, etc.). Block S105 can also function to determine a distraction level of the driver. Block S105 can include determining driver control inputs, determining occupant (e.g., driver and/or passenger) data, and determining a driver distraction factor (e.g., a value characterizing a level of driver distraction), each of which can be performed substantially simultaneously, asynchronously, periodically, and/or with any other suitable temporal characteristics. Block S105 is preferably performed at the onboard vehicle system, and more preferably at an inward facing camera of the onboard vehicle system; however, Block S105 can be otherwise suitably performed at any other suitable system and/or system components. In one alternative variation, Block S105 includes linking to a mobile device associated with one or more occupants (e.g., linking the onboard vehicle system to the mobile device, linking the vehicle computer to the mobile device, etc.) and automatically pairing with the mobile device and retrieving data associated with one or more occupants from a database.

In a specific example, determining driver distraction in relation to Block S105 and/or other Blocks of the method 100 includes determining driver distraction substantially as described in U.S. application Ser. No. 15/805,348, titled "System and Method for Driver Distraction Determination" and filed 7 Nov. 2017, which is incorporated herein in its entirety by this reference. However, determining driver distraction can be otherwise suitably performed.

Determining driver control inputs functions to obtain information indicative of actions taken by a driver intended to control the vehicle (e.g., steering control inputs, pedal control inputs, etc.). In a first variation, determining driver control inputs includes performing object recognition and classification to determine positions of a driver's hands on a steering wheel of the vehicle, determining trajectories of the driver's hand in the rotational plane of the steering wheel, and computing a steering input parameter (e.g., a number of degrees through which the steering wheel was rotated) from the imagery data. In another variation, determining driver control inputs includes determining an acceleration parameter (e.g., a throttle level applied by a driver) based on auditory data that includes an engine noise (e.g., noise originating from engine revolutions) produced due to an acceleration input (e.g., that increases or decreases the frequency and/or volume of an engine noise). In another variation, determining drive control inputs includes determining a number of times within a specified time period the driver has provided a control input at the steering wheel, based on gyroscopic data sampled from a gyroscope of the onboard vehicle system. However, determining driver control inputs can be otherwise suitably performed in any suitable manner.

Determining occupant data can function to obtain data related to vehicle occupants for incorporation into a contextual dataset and/or for subsequent provision to other Blocks of the method. Determining occupant data can include performing facial recognition and/or other suitable image processing on interior sensor data (e.g., inward-facing imagery) collected by an onboard vehicle system (e.g., to determine driver identity, passenger identity, number of passengers, to estimate gross passenger weight, etc.). Occupant data can include driver identity data (e.g., retrieved from a database associated with a user account and/or profile of the driver), such as a driver's license number, a registration number, a driver name, and/or any other suitable data identifying the driver. However, determining occupant data can include otherwise suitably determining any suitable data.

The distraction factor value can be determined using equations, regression, classification, neural networks (e.g., convolutional neural networks, deep neural networks), heuristics, selection (e.g., from a library, graph, or chart), instance-based methods (e.g., nearest neighbor), regularization methods (e.g., ridge regression), decision trees, Bayesian methods, kernel methods, probability, deterministic methods, a combination of the above, or any other suitable method. The distraction factor value can be a binary state, a score, or be any other suitable measure of a driver's distraction level.

Block S100 can include Block S110, which includes: determining an exterior event. Block S110 functions to determine a driving event based on data collected in relation to occurrences exterior to (e.g., outside the cabin of) the vehicle. The exterior event can be determined to be any of the aforementioned driving events, as well as any other suitable driving event. The exterior event can also be determined based on any of the data types, characteristics, and/or parameters described above (e.g., vehicle operational data, driver behavior data, intrinsic vehicle data, etc.) which are sampled at and/or extracted from exterior-oriented data streams (e.g., an exterior-facing camera, a rangefinder directed at objects surrounding the vehicle, a portion of an interior-facing camera frame that views regions outside the vehicle, etc.).

In an example of Block S110, determining the exterior event can determining that a distance between the vehicle and an object depicted in a first region of an image stream (e.g., corresponding to an exterior-facing camera) has fallen below a threshold distance. The exterior event in this example is the crossing of the threshold distance by the object, wherein the distance is determined (e.g., as exterior activity data) in accordance with a variation of Block S106. In a related example, the object can be a secondary vehicle, and determining the exterior event includes determining that the relative position between the vehicle and the secondary vehicle has fallen below a threshold distance (e.g., such as in an instance of tailgating, the secondary vehicle cutting off the vehicle, the secondary vehicle suddenly braking, etc.).

Block S100 can include Block S120, which includes: determining an interior event. Block S120 functions to determine a driving event based on data collected in relation to occurrences interior to (e.g., within the cabin of) the vehicle. The interior event can be determined to be any of the aforementioned driving events, as well as any other suitable driving event. The interior event can also be determined based on any of the data types, characteristics, and/or parameters described above (e.g., driver distraction based on imagery of the driver, vehicle operational data such as driver control inputs, driver behavior data, extrinsic vehicle data, etc.) which are sampled at and/or extracted from interior-oriented data streams (e.g., an interior-facing camera, a rangefinder directed at objects inside the vehicle, a portion of an exterior-facing camera frame that views regions inside the vehicle, etc.).

In an example of Block S120, determining an interior event can include mapping a driver gaze direction relative to a first region of an image stream from an exterior camera (e.g., extracted in accordance with a variation of Block S106 based on a relative orientation between an interior-facing camera and an exterior-facing camera of the onboard vehicle system). In this example, the interior event includes the driver looking toward a particular region of the external environment (e.g., as depicted within the image stream from an external facing camera).

In another example of Block S120, determining the interior event includes determining a driver distraction event based on a mean time interval between control inputs (e.g., steering inputs, pedal inputs, etc.) exceeding a threshold duration.

Block S130 includes: correlating the exterior event with the interior event to generate combined event data. Inputs to Block S130 include an exterior event and an interior event, as determined in relation to portions of Block S100 (e.g., Block S110, Block S120, etc.). Inputs to Block S130 can thus include vehicle operational data, vehicle context data, and/or driver behavior data as described above, and/or any other suitable data. Block S130 functions to produce an enriched (e.g., multivariate, weighted) dataset obtained by collecting interior event data and exterior event data from a population of vehicles and/or drivers. Block S130 can also function to determine the context, optionally including driver behavior, of a vehicle operational datum (e.g., a parameter value of one of any suitable vehicle operational parameter or characteristic). Block S130 can be performed substantially in real- or near-real time in conjunction with S110 and S120, but can additionally or alternatively be performed asynchronously or with any other suitable relative temporal characteristics. Block S130 can be performed continuously, upon detection of a trigger (e.g., a detected vehicle event such as a swerve, lane change, start, stop, etc.), or otherwise suitably performed. Block S130 can include synchronizing input data with vehicle operational data, labeling synchronized data, transmitting synchronized and labeled data to a remote computing system, and determining a weighting for the vehicle operational data, each of which can be performed substantially simultaneously, asynchronously, and/or with any other suitable relative temporal characteristics. Block S130 is preferably implemented at a population of vehicles, each having an onboard vehicle system, in combination with one or more analysis modules of a remote computing system; however, Block S130 can be otherwise suitably implemented at any suitable system and/or combination of systems.

In a variation, Block S130 can include generating a training dataset using the combined event data. The training dataset can include: physical locations of external objects (e.g., detected from outward-facing sensor signals) relative to a vehicle reference point (e.g., the driver's eyes, gaze direction, sensor mounting point, other internal reference point, etc.); internal object position (e.g., location, pose) relative to external object position; external object trajectory relative to the vehicle reference point; internal or external video frame(s) associated with user parameters and/or vehicle operation parameters; or any other suitable data. The analysis modules can be implemented using equations, regression, classification, neural networks (e.g., convolutional neural networks, deep neural networks), heuristics, selection (e.g., from a library, graph, or chart), instance-based methods (e.g., nearest neighbor), regularization methods (e.g., ridge regression), decision trees, Bayesian methods, kernel methods, probability, deterministic methods, a combination of the above, or any other suitable method.

Generating a training dataset can include classifying event data (e.g., combined event data) to generate an event label and labeling the event data (e.g., the classified data) with the event label. Classifying and labeling is preferably performed automatically (e.g., by a classifier and/or labeler model implemented at a computer system of the onboard computing system, a remote computing system, etc.), but can additionally or alternatively be performed by a human in whole or in part (e.g., via bootstrapping the classifier and/or labeler, via purely-human classification and/or labeling, etc.). Labeling event data can include labeling the underlying sampled data stream (e.g., a portion of a data stream sampled within a time window and from which event data is determined) and/or derived data (e.g., the combined event data), and any other suitable data.

Block S130 can include synchronizing interior and exterior events (e.g., as determined in Block S120 and S110, respectively). Synchronizing interior and exterior events functions to associate interior event data (e.g., vehicle context data, driver behavior data) with related exterior event data to generate synchronized data (e.g., wherein the combined event data is synchronized data). Synchronizing can include temporally synchronizing, spatially synchronizing, or otherwise suitably synchronizing. Labeling synchronized data can function to associate the synchronized data with labels (e.g., header data) that enable categorization and/or correlation of the synchronized data by other Blocks of the method, and to generate synchronized labeled data. Transmitting synchronized (and/or labeled) data to a remote computing system functions to provide the data for analysis at the remote computing system in combination with data received from other vehicles of the population of vehicles. The output of the synchronization, labeling, and/or transmitting of the input data can be used for weighting the vehicle operational data, or for any other suitable purpose.

In a specific example, Block S130 can include determining that a driver gaze direction (e.g., determined in accordance with a variation of Block S120) overlaps with a region of an external image stream (e.g., corresponding to an object as it crosses a threshold relative distance determined in accordance with a variation of Block S110) at a time point within a time window (e.g., a time window in which the source data for determination of the driver's gaze direction is sampled in accordance with a variation of Block S104; concurrently, simultaneously, contemporaneously, etc.), and determining a risk value, risk score, and any other suitable distraction metric value based on gaze direction overlap with an exterior feature of interest (e.g., the region of the external image stream sampled from an exterior-facing camera) and/or an object of interest (e.g., a blob in vehicle trajectory or path; a moving or stationary obstacle; road signage such as traffic light, stop sign, road-painted signs, etc.; and any other suitable object, etc.).

In relation to Block S130, determining a weighting (e.g., weight factor) for driving event data functions to modify the event data (e.g., exterior event data, interior event data, etc.) with contextual data (e.g., interior event data, exterior event data) in order to generate the training dataset. Determining the weighting can include determining a driver score (e.g., from driver behavior determined in Block S105, historic driving behavior retrieved from a database, from a driver distraction factor, from a driver profile stored onboard the vehicle at the onboard vehicle system, etc.), determining a context score (e.g., from an adverse weather determination such as low visibility, a vehicle intrinsic datum such as suboptimal suspension operation, etc.), and/or otherwise suitably determining a weighting (e.g., weight factor). Determining the weighting can include weighting the vehicle operational data to generate weighted vehicle operational data (e.g., a training dataset). Determining the weighting is preferably performed by the remote computing system, but can be otherwise suitably performed at any suitable location. Determining the weighting can be based on vehicle operational data, contextual data, and/or driver behavior data; alternatively, a weighting can be determined based on any other suitable data.

In relation to determining a weighting, the event data can include a weightable characteristic (e.g., a characteristic that can be weighted). A weightable characteristic can include an event score, an event severity (e.g., a quantitative severity spanning a number from 0-100 wherein 0 corresponds to a non-event and a 100 corresponds to a collision that totals the vehicle; a qualitative severity selected from among several predetermined severity categories such as near-miss, fender-bender, vehicle inoperative, vehicle totaled; etc.), and any other suitable characteristic of an event to which a weight can be assigned (e.g., wherein the weighting is determined as described above).

In another variation, Block S130 includes determining a distraction score based on correlating driver gaze parameters (e.g., a gaze direction determined in one or more variations of Block S120) with a position of an object (e.g., a risky object position determined in one or more variations of Block S110). The determined distraction score in this variation can define a static value, and can also define a dynamic value (e.g., a value that increases as a function of gaze distance from the risky object, a value based on a probability of the gaze overlapping the risky object within a time window, a value based on a gaze sweep velocity, etc.). In a first example of this variation, determining the distraction score can include generating a virtual representation of the scene based on interior and exterior imagery and correlating driver gaze parameters and object position in virtual space. In a second example of this variation, determining the distractions core can be based on a pixel map of image regions in both the interior imagery and the exterior imagery (e.g., wherein a left side of an exterior image corresponds to a right side of an interior image due to the relative geometric arrangement of the interior and exterior cameras).

In another variation, Block S130 includes determining a driver distraction score based on a reaction of the driver (e.g., determined in accordance with one or more variations of Block S100) to an object (e.g., a position or behavior of the object determined in accordance with one or more variations of Block S100). For example, Block S130 can include determining a gaze region in an exterior image based on a gaze direction of the driver (e.g., based on a standard viewing area associated with a human gaze, based on a historical perception region from historical data, based on historical data related to perceived objects or objects reacted to when a particular driver gazes toward a particular region, etc.), determining objects within the gaze region (e.g., in accordance with one or more variations of Block S110), determining a driver reaction (e.g., in accordance with one or more variations of Block S120, based on a subsequent driver action, etc.) to the determined objects, and determining (e.g., increasing, decreasing, selecting, computing, etc.) a distraction score based on the driver reaction.

In relation to Block S130, correlating the interior event and the exterior event can include determining a multifactorial risk score. Block S130 can include determining a multifactorial risk score based on a combination of the interior event (e.g., a driver distraction event) and the exterior event (e.g., an aggressive driving event such as tailgating, overly rapid lane change, etc.), wherein the multifactorial risk score is nonlinearly related to the risk scores associated with each of the interior and/or exterior events individually. For example, a multifactorial risk score for a combined event (e.g., a driving event including a correlated interior event and exterior event) can be four times the risk score associated with the interior event or the exterior event in isolation; however, the magnitude of the multifactorial risk score can additionally or alternatively be related to the magnitudes of the risk scores of the interior and/or exterior events in any other suitable manner.

In another specific example of Block S130, correlating the interior event with the exterior event can include: determining a distraction weight based on the driver distraction event; determining a severity of the exterior event; and weighting the severity of the exterior event by the distraction weight. In this example, the combined event data includes a distraction-weighted exterior event.

In a variation of Block S130, the interior and exterior events can be correlated with a third driving event. For example, Block S100 can include determining a near-miss event, and Block S130 can include associating an interior event (e.g., determined in accordance with a variation of Block S110) with the near-miss event and associating the exterior event (e.g., determined in accordance with a variation of Block S120) with the near-miss event. In this example and related examples, the combined event data generated in Block S130 can include the near-miss event itself and the associated interior and exterior event, respectively. In this variation, Block S130 can include assigning causality between the third driving event and one or more of the interior event and the exterior event. For example, the interior event can include a driver distraction event, the third driving event can be a near-miss event, and Block S130 can include determining that the driver distraction event caused the near-miss event. Such a determination can be made based on the exterior event (e.g., wherein the exterior event is a following distance falling below a threshold, and the determination can include that the following distance was too little for adequate response time given the driver distraction event in the event of a crash or other adverse event, leading to the determination of a near-miss event). Assigning causality can include calculating a probability that a driving event caused another driving event (e.g., based on historical or actuarial data, based on an event-fault model that associates driver behaviors with outcomes based on predictive analytics, etc.).

In another specific example, determining the exterior event includes determining a near-miss event (e.g., wherein the exterior event is a near-miss event), and Block S130 includes associating the interior event with the near-miss event and calculating a probability that the interior event caused the near-miss event. In this example, the generated combined event data includes the near-miss event, the associated interior event, and the calculated probability.

The method 100 can include Block S135, which includes: transmitting data between an onboard system and a remote computing system S135. Block S135 functions to transfer data between the vehicle (e.g., an onboard system of the vehicle) and a remote location (e.g., a remote computing system). Block S135 can also function to transfer control instructions (e.g., wherein the data includes control instructions). Block S135 can also function to transfer raw data (e.g., data sampled in accordance with one or more variations of Block S104), extracted data (e.g., data extracted in accordance with one or more variations of Block S106), event data (e.g., driving event data determined in accordance with one or more variations of Block S100), and/or any other suitable data. Transmitted data is preferably performed by a communications system (e.g., of an onboard vehicle system, of a remote computing system, etc.), but can additionally or alternatively be performed by any suitable system or components. Block S135 can be performed at various times relative to various Blocks of the method 100, dependent upon whether a previous or subsequent Block is performed at an onboard system or at a remote system. For example, Block S135 can include transmitting raw sensor data between an onboard system and the remote computing system, and accordingly can be executed after Block S104 and prior to Block S106. In another example, Block S135 can include transmitting combined event data to the remote computing system, and accordingly can be executed subsequent to Block S130 and prior to Block S140. However, Block S135 can additionally or alternatively be executed at any suitable time.

The method 100 can optionally include Block S140, which includes training an event-based model based on the combined event data. Block S140 functions to generate a trained model (e.g., for autonomous vehicle control, for automatic driving event classification, etc.). Models trained using the generated dataset from Block S130 can include any one or more of the models previously mentioned, and/or any other suitable models.

Block S140 can be performed in real time (e.g., as the training set is generated), in non-real time (e.g., after the generation of a training dataset corpus for deployment), in response to a trigger event (e.g., a user request), and/or otherwise performed with any suitable temporal characteristics.

In a first variation, Block S140 includes training a vehicle control model, wherein the vehicle control model associates event data (e.g., interior event data, exterior event data, etc.) with a desired vehicle control input to achieve a planning goal (e.g., a primitive planning goal such as lane keeping, a complex planning goal such as route following in accordance with traffic rules and signals, etc.). In a second variation, Block S140 includes training a notification model, wherein the notification model generates a driver notification based on event data (e.g., interior event data, exterior event data, combined event data, etc.). The driver notification can include various notification types, such as an audio message (e.g., a tone, a spoken message, etc.) rendered at an aural output mechanism (e.g., of an onboard vehicle system, of a mobile device onboard the vehicle, etc.), a visual message (e.g., a flashing light, a continuous light, text notifications, etc.) rendered at a visual output mechanism (e.g., of an onboard vehicle system, of a mobile device onboard the vehicle, etc.), haptic feedback (e.g., at the steering wheel, chair, etc.), and/or any other suitable notification type. The driver notification generated by the notification model can include notification parameters, wherein the notification parameters can be determined (e.g., calculated, selected, estimated, iteratively determined, output by a trained model, etc.) based on: event data (e.g., the event class), the distraction score, user preferences or history, or based on any other suitable driving context parameter value. Examples of notification parameters include: duration; pattern; output source; intensity, or any other suitable notification parameter. However, the intensity of the driver notification can be otherwise based and/or otherwise suitably determined.

Figure 5:
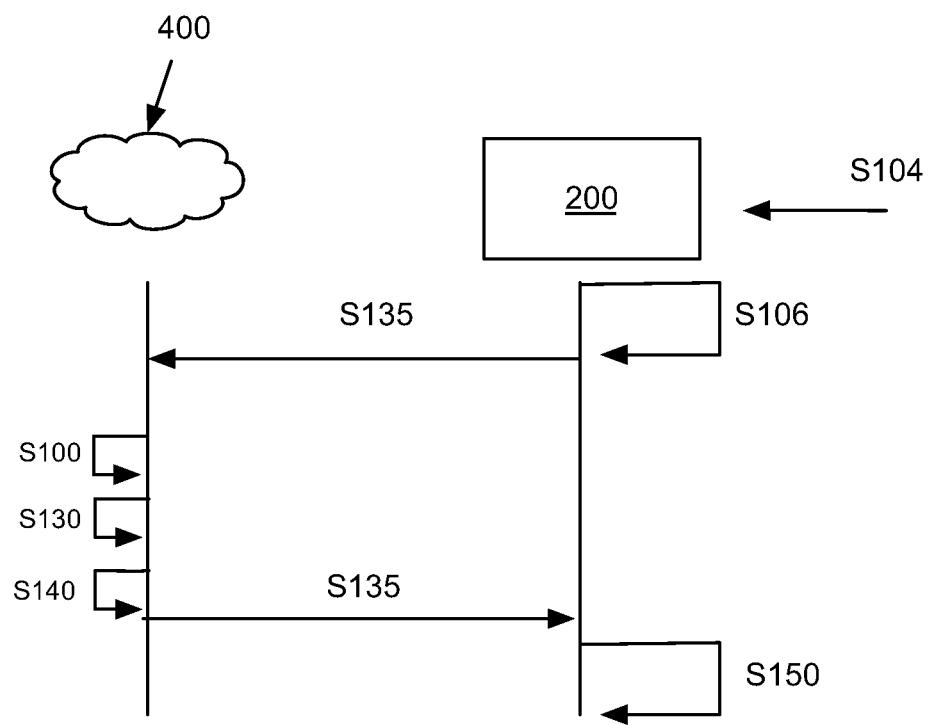
FIG. 5 is a flowchart representation of a variation of a portion of an example implementation of the method.
Figure 6:
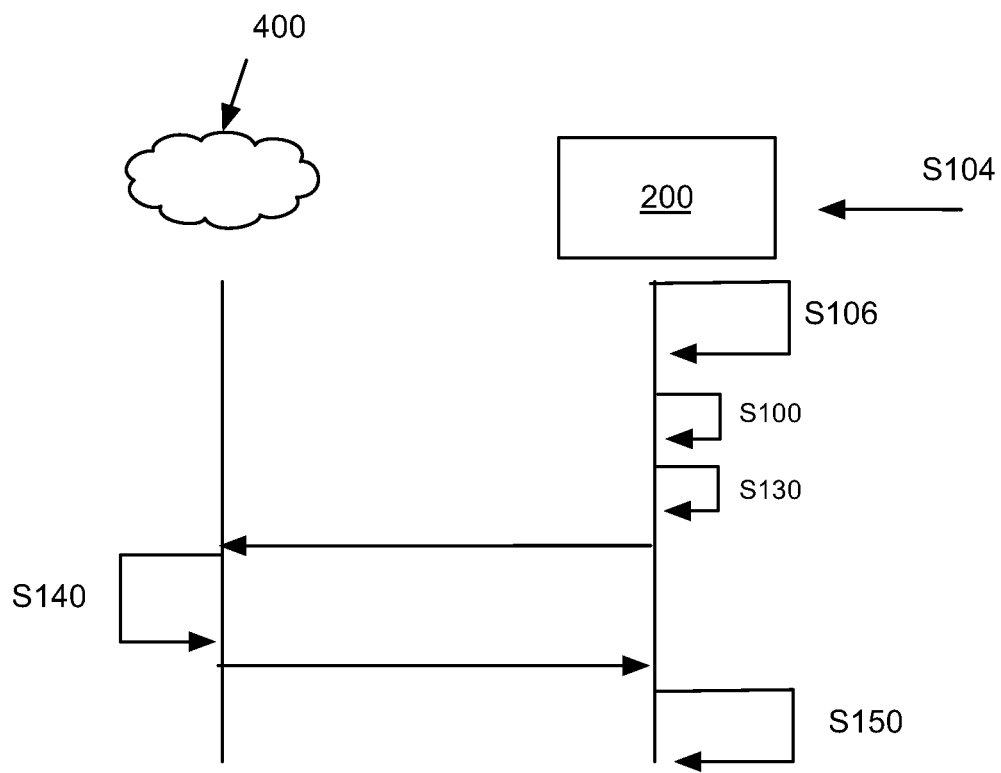
FIG. 6 is a flowchart representation of a variation of a portion of an example implementation of the method.

The method can optionally include Block S150, which includes implementing the event-based model (e.g., as trained in accordance with variations of Block S140). For example, Block S150 can include using the trained model to control autonomous vehicle operation. Block S150 functions to automatically or semi-automatically operate a vehicle. Block S150 can include remotely controlling the autonomous vehicle; for example, as shown in FIG. 5, the method can include streaming sensor data (e.g., contextual data, intrinsic vehicle data, etc.) to a remote computing system, generating control instructions at the remote computing system using the trained model, and transmitting control instructions to the vehicle where the control instructions are automatically executed. In another variation, as shown in FIG. 6, Block S150 can include transmitting parameters of the trained model to a vehicle, and the vehicle (e.g., a computing system at the vehicle) uses the trained model to determine control instructions based on sensor data collected at the vehicle (e.g., at an onboard vehicle system of the vehicle). However, Block S150 can be otherwise suitably performed in any suitable manner and at any suitable location.

Block S150 can include implementing a notification model to transmit an event-based notification to a driver. The notification is preferably transmitted in real-time (e.g., substantially real-time, near real-time, etc.) based on or in response to driving event determination (e.g., as in variations of Block S100), interior and exterior event correlation (e.g., as in variations of Block S130), and any other suitable Block or portion of the method 100. In a specific example, Block S150 includes transmitting an event-based notification to the driver in response to determining a multifactorial risk score, wherein the intensity of the notification (e.g., volume of an audio notification, frequency of an alert message, etc.) is based on the magnitude of the multifactorial risk score (e.g., determined in accordance with one or more variations of Block S130). However, Block S150 can include transmitting or otherwise providing a notification to a driver in any other suitable manner and with any suitable basis.

The systems and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processor and/or the controller 430. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the various system components and/or method blocks.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

The invention claimed is:

1. A method involving a first image stream and a second image stream, the method comprising:
   sampling the first image stream within a first time window at an interior-facing camera of an onboard vehicle system, wherein the onboard vehicle system is integrated into a mountable unit configured to couple to a vehicle;
   electronically extracting interior activity data indicating a state of a driver from the first image stream;
   determining an interior event based on the interior activity data;
   sampling the second image stream within a second time window at an exterior-facing camera of the onboard vehicle system, wherein the first time window and the second time window are coextensive;
   electronically extracting exterior activity data from the second image stream;
   determining an exterior event based on the exterior activity data;
   correlating the interior event and the exterior event to generate combined event data, wherein the act of correlating comprises:
      determining a weight based on the driver distraction event,
      determining a metric associated with the exterior event, and
      weighting the metric associated with the exterior event by the weight to obtain a weighted metric; and
   classifying the combined event data
   wherein the act of determining the interior event, the act of determining the exterior event, and the act of correlating the interior event and the exterior event to generate combined event data, are performed by one or more electronic processing units.

2. The method of claim 1, wherein the act of electronically extracting the exterior activity data comprises:
   determining a relative position between the vehicle and an object depicted in the second image stream.

3. The method of claim 2, wherein the object is a secondary vehicle, and wherein the act of determining the exterior event comprises determining that the relative position between the vehicle and the secondary vehicle is below a threshold distance.

4. The method of claim 1, wherein the exterior event comprises a near-miss event, wherein the near-miss event occurs within the first-time window, and wherein the act of correlating the interior event and the exterior event comprises associating the interior event with the near-miss event; and
   wherein the combined event data comprises the near-miss event, and the associated interior event.

5. The method of claim 1, wherein the state of the driver comprises a distracted state, and the electronically extracted interior activity data indicates the distracted state of the driver.

6. The method of claim 1, wherein the metric associated with the exterior event indicates a severity of the exterior event.

7. The method of claim 1, further comprising generating training data based on the classified combined event data.

8. The method of claim 7, further comprising:
   training a vehicle control model using the training data; and
   transmitting a copy of the vehicle control model to the vehicle for controlling the vehicle.

9. A method involving a first image stream and a second image stream, the method comprising:
   sampling the first data stream within a first time window at a first sensor of an onboard vehicle system that is configured to couple to a vehicle;
   electronically extracting interior activity data from the first data stream;
   determining an interior event based on the interior activity data;
   sampling the second data stream within a second time window at a second sensor of the onboard vehicle system;
   electronically extracting exterior activity data from the second image stream;
   determining an exterior event based on the exterior activity data;
   correlating the exterior event and the interior event to generate combined event data, wherein the act of correlating the interior event with the exterior event comprises calculating a probability that the interior event caused the exterior event, wherein the combined event data comprises the exterior event, the interior event, and the probability; and
   classifying the combined event data
   wherein the act of determining the interior event, the act of determining the exterior event, and the act of correlating the exterior event and the interior event to generate combined event data, are performed by one or more electronic processing units.

10. The method of claim 9, wherein the first data stream comprises gyroscope data.

11. The method of claim 10, wherein the act of electronically extracting the interior activity data comprises determining a mean time interval between steering inputs based on the gyroscope data and
    wherein the act of determining the interior event comprises determining a driver distraction event based on the mean time interval exceeding a threshold duration.

12. The method of claim 9, wherein the act of correlating the exterior event and the interior event comprises:
    determining a weight based on the interior event;
    determining a metric associated with the exterior event; and
    weighting the metric associated with the exterior event by the weight to obtain a weighted metric.

13. The method of claim 9, wherein the onboard vehicle system is integrated into a mountable unit configured to couple to the vehicle.

14. The method of claim 9, wherein the interior event and the exterior event are correlated based on relative geometric arrangement between the first sensor and the second sensor.

15. The method of claim 9, wherein the first data stream comprises a first image stream, and the first sensor comprises a first camera of the onboard vehicle system; and wherein the second data stream comprises a second image stream, and the second sensor comprises a second camera of the onboard vehicle system.

16. The method of claim 9, wherein the first time window is coextensive with the second time window.

17. The method of claim 9, further comprising generating training data based on the classified combined event data.

18. The method of claim 17, further comprising:

training a vehicle control model using the training data.

* * * * *